March 27, 1951

D. P. REDDING 2,546,276

INSTRUMENT FOR DETERMINING SUBLUXATIONS
IN THE SPINE OF A PATIENT

Filed Dec. 22, 1948

Inventor
Daniel P. Redding

By
Fishburn & Mullendore
Attorneys

Patented Mar. 27, 1951

2,546,276

UNITED STATES PATENT OFFICE 2,546,276

INSTRUMENT FOR DETERMINING SUBLUXATIONS IN THE SPINE OF A PATIENT

Daniel P. Redding, Kansas City, Mo.

Application December 22, 1948, Serial No. 66,623

7 Claims. (Cl. 128—2.1)

This invention relates to an instrument for determining subluxations in the spine of a patient as indicated by differential heat areas on opposite sides of a median line of the back.

Instruments of this character usually comprise a current indicator and a pair of detectors each having a plurality of thermocouples connected to form thermopiles having electrical connections with the indicator. The instrument is used by supporting the detectors with the thermocouples in contact with the areas along the side of the spine whereby differentials in temperature of one area on one side and the corresponding area on the other side establish a current flow to actuate the indicator to indicate the warmer of the areas and the extent of temperature differential. The efficiency of the instrument is dependent upon contact of the thermocouples with the area under measurement. It is, therefore, a principal object of the invention to provide a mounting of the detectors whereon they may be moved apart in accordance with the spacing of the area and to retain position of the detectors whereby all thermocouples on each detector have the same contact with the respective areas.

Other objects of the invention are to provide an adjustable means for moving the detectors which effects simultaneous and like movement of both detectors relatively to the median point of the instrument; and to provide a simple and efficient adjusting mechanism which can be manipulated while the thermocouples are in position to engage the areas to be measured.

In accomplishing these and other objects of the invention as hereinafter pointed out, I have provided improved structure, the preferred form of which is illustrated in the accompanying drawing wherein.

Figure 1:
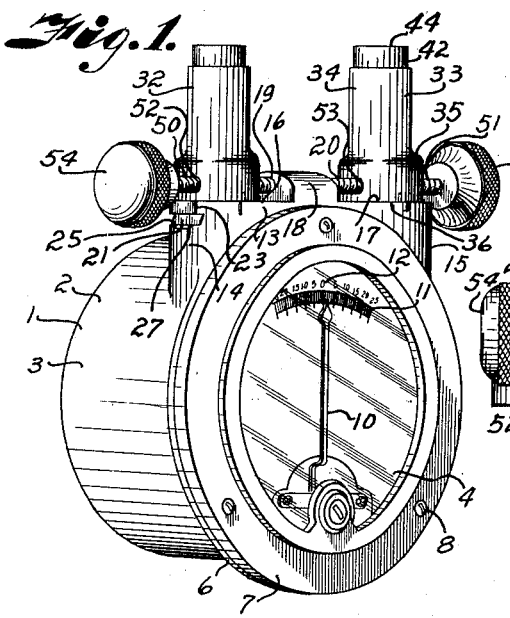
Fig. 1 is a perspective view of an instrument equipped with detectors mounted and actuated in accordance with the present invention.

Referring more in detail to the drawings:

1 designates an instrument constructed in accordance with the present invention for comparing temperatures of areas on the respective sides of the spine. The instrument includes a casing 2 having a cylindrical wall 3 of suitable diameter to receive therein an indicating mechanism, for example, a milliammeter 4. The back of the casing is closed by a wall 5 and the front is provided with an outwardly extending annular flange 6 to which the annular flange 7 of the milliammeter is secured by fastening devices such as screws 8. The milliammeter includes a casing 9 containing the operating mechanism for actuating a pointer 10 over a scale 11 graduated from a central zero position 12 toward the respective sides to indicate the deflection of the needle from zero to the right or the left, depending upon the directional flow of current through the milliammeter.

Figure 2:
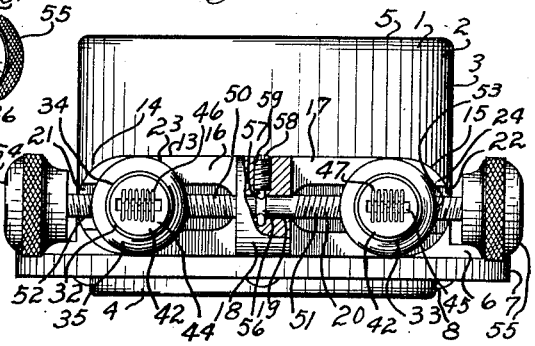
Fig. 2 is a plan view of the instrument as viewed from the thermocouple ends of the detectors.

Extending laterally from the wall 3 is a transverse boss 13 having rounded ends 14—15 and substantially flat top faces 16—17 on the respective sides of an outwardly projecting lug 18. The lug 18 has an axial opening 19 extending parallel with the face portions 16 and 17 for rotatably mounting a screw shaft 20 later described. Formed in the faces 16 and 17 and opening inwardly from the rounded ends 14 and 15 are guide grooves 21 and 22 shaped to provide inwardly extending flanges 23 and 24 extending over ways 25 and 26 that are formed in the sides of the grooves near the respective bottoms 27 thereof. The inner ends of the grooves terminate adjacent the respective sides of the lug 18 as shown in Fig. 2. Registering with the guide grooves and connecting the instrument compartment 28 in the casing are elongated openings 29 for passing flexible conductors 30 and 31 that connect the milliammeter with detectors 32 and 33.

The detectors 32 and 33 are of like construction and each comprises a substantially cylindrically shaped post 34 having an enlarged base portion 35 provided with a flat face 36 encircling reduced cylindrical extensions 37 having a diameter to slide freely between the flange portions 23 and 24 of the guideways. Formed on the terminal of the reduced extensions are annular flanges 38 having diameters to engage freely within the ways 25 and 26 and of a thickness to provide a close sliding fit therein. The detectors have axial bores 39 extending therethrough in registry with the slot-like openings 29.

Figure 3:
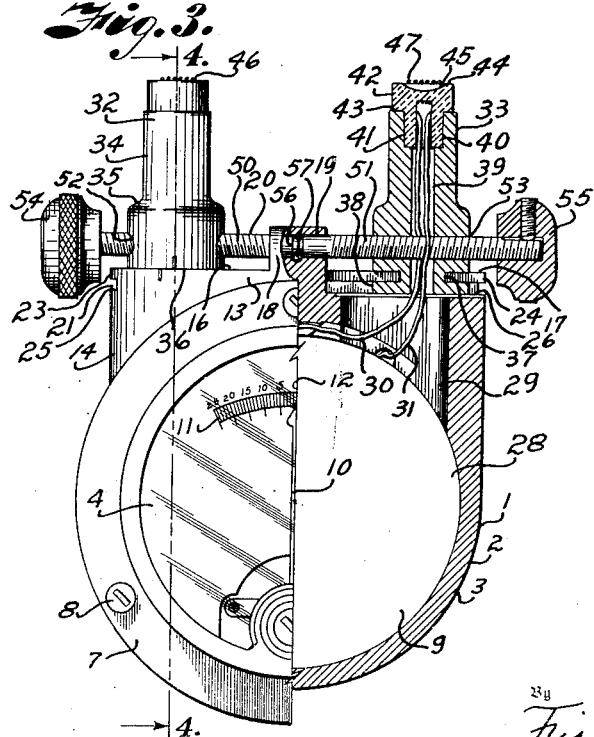
Fig. 3 is a front elevational view of the instrument in part section to better illustrate the construction of the detectors and mounting thereof on the instrument casing.
Figure 4:
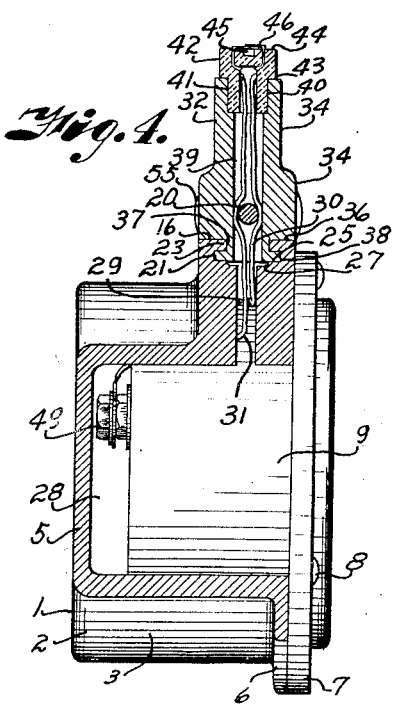
Fig. 4 is a vertical section on the line 4—4 of Fig. 3.

The outer ends of the posts 34 are counterbored as at 40 to seat neck portions 41 of insulators 42 which have shoulder portions 43 seated firmly on the ends of the post portions of the detectors so as to maintain outer faces 44 of the tips in substantially the same plane. The outer faces of the tips are grooved as indicated at 45 and extending thereacross are a plurality of thermocouples 46 for the detector 32 and 47 for the detector 33. The thermocouples are arranged in parallel position and suitably connected together so as to form a thermopile on each tip. The endmost terminals of the thermopiles are interconnected by a common conductor 30 that extends through bores of the detectors and through the slot-like openings and through a space in the meter compartment as shown in Fig. 3. The outer terminals of the respective thermopiles are connected by the conductors 31 with the terminals 49 of the meter so that current flowing through the thermocouples is indicated by the deflection of the pointer of the meter to the right or left depending upon the direction of the flow. The detectors are adapted to be moved along the guides to adjustably space the detectors in accordance with the spacing of the areas to be measured by means of the screw shaft 20. The ends of the screw shaft are therefore respectively provided with right and left threads 50 and 51 which respectively engage internal threads in transverse openings 52 and 53 extending through the base of the detectors as best shown in Fig. 3. The ends of the shaft project slightly beyond the sides of the casing and are provided with knobs 54 and 55 by which the shaft is adapted to be turned in one or the other direction depending upon the desired movement of the detectors.

In order to anchor the shaft within the lug 18, the shaft is provided with an annular groove 56 to be engaged by a terminal 57 on the end of a screw 58 that is threaded into an opening 59 in the lug as shown in Fig. 2.

When using the instrument constructed and assembled as described, the operator supports the instrument by one hand and the tips of the detectors are brought into position to engage areas on the respective sides of the patient's spine. One or the other knob is engaged between the thumb and finger of the other hand and the shaft turned in one or the other direction to move the detectors to or from each other to vary the spacing therebetween in accordance with the space of the areas to be contacted on the respective sides of the spine. The detectors are then glided lightly along the areas. If the side areas are of the same temperature, the current flow through one thermopile is counteracted by the other and the needle remains in zero position. However, if a vertebra is out of place and interferes with flow of the nerve force, heat is radiated from the affected side causing a greater flow of current through the thermocouples on the detector at that side which is indicated by deflection of the pointer of the meter. If the warmer area occurs on the opposite side, the deflection of the pointer is in the opposite direction, the relative differential in temperature being reflected by the magnitude of movement of the pointer from zero.

From the foregoing it is obvious that I have provided an instrument of the character described wherein the detectors are readily adjusted according to the width or spacing between the areas to be tested and that during shift of the detectors, the tips retain the same relative position so that the thermocouples present the same relative contact with the areas to be tested. It is also obvious that I have provided an adjusting mechanism that is of simple construction whereby both detectors may be moved simultaneously and kept in proper axial spacing with respect to the center of the meter casing.

What I claim and desire to secure by Letters Patent is:

1. A device of the character described including a casing, an indicating instrument in the casing, a pair of detectors, thermocouples carried by the detectors, means for slidably mounting the detectors on the casing for movement to and from each other, a screw shaft having right and left connections with the detectors, means rotatably mounting said shaft in the casing and retaining the shaft from axial movement with respect thereto, a knob on the shaft for turning the shaft for effecting said movement of the detectors, and electrical connections between the thermocouples and indicator and having portions movable with the detectors.

2. A device of the character described including a casing for housing an indicator and having a base portion provided with longitudinal guide grooves, post-like detectors having base portions slidably mounted in the respective guide grooves, a lug projecting from the housing intermediate the guide grooves, a shaft having a fixed rotatable mounting in the lug and provided with right and left threaded portions respectively engaging in internally threaded openings in the base portions of the detectors, and means on the shaft for turning the shaft to effect movement of the detectors along the guide groove.

3. A device of the character described including a casing having transverse guide means, detectors having portions slidably mounted in the guide means, thermocouples on the detectors, a screw shaft extending parallel with the guide means and having right and left threaded connections with the respective detectors, means on the shaft for turning the shaft to effect simultaneous movement of the detectors, an indicating instrument in the casing, and electrical connections between the thermocouples and the indicator and having portions movable with the detectors.

4. A device of the character described including a casing for housing an indicator and having a base portion provided with longitudinal guide grooves, post-like detectors having base portions slidably mounted in the guide groove, a lug projecting from the housing intermediate the guide grooves, a shaft having fixed rotatable mounting in the lug and provided with right and left threaded portions respectively engaging in internally threaded openings in the base of the detectors, and knobs on the ends of the shaft for turning the shaft to effect movement of the detectors along the guide groove.

5. A device of the character described including a casing, an indicating instrument in the casing, a pair of detectors having base portions provided with axial extensions having annular flanges, thermocouples carried by the detectors, grooves having ways in the sides thereof for slidably mounting the said flanges of the detectors for retaining the detectors on the casing for movement to and from each other, a screw shaft having right and left connections with the detectors, means rotatably mounting said shaft in the casing and retaining the shaft from axial movement with respect thereto, means on the shaft for turning the shaft for effecting said movement of the detectors, and electrical connections between the thermocouples and indicator and having portions movable with the detectors.

6. A device of the character described including a casing, an indicating instrument in the casing, a pair of detectors having base portions provided with axial extensions having annular flanges, thermocouples carried by the detectors, grooves having ways in the sides thereof for slidably mounting said flanges of the detectors for retaining the detectors on the casing for movement to and from each other, a screw shaft extending parallel with the guide and having right and left threaded connections with the respective detectors, knobs on the ends of the shaft for turning the shaft to effect movement of the detectors, an indicating instrument in the casing, and flexible electrical connections between the thermocouples and the indicator.

7. A device of the character described including a casing for housing an indicator and having a base portion provided with longitudinal guide grooves, post-like detectors having base portions slidably mounted in the guide grooves, a lug projecting from the housing intermediate the detectors, a shaft having rotatable mounting in the lug and provided with right and left threaded portions respectively engaging in internally threaded openings in the base of the detectors and having an annular groove, a screw threaded into the lug and having a terminal engaging in said shaft groove, and knobs on the ends of the shaft for turning the shaft to effect movement of the detectors along the guide grooves.

DANIEL P. REDDING.

REFERENCES CITED

The following references are of record in the file of this patent:

UNITED STATES PATENTS

| Number | Name | Date |
| --- | --- | --- |
| 1,610,271 | Evins | Dec. 14, 1926 |
| 1,648,939 | Evins | Nov. 15, 1927 |
| 1,648,942 | Hayman | Nov. 15, 1927 |
| 1,752,117 | Smith | Mar. 25, 1930 |
| 2,008,295 | Smith | July 16, 1935 |
| 2,111,677 | Robinson | Mar. 22, 1938 |